(12) United States Patent
Kumar et al.

(10) Patent No.: US 11,210,486 B2
(45) Date of Patent: Dec. 28, 2021

(54) SYSTEM AND METHOD FOR PRODUCING MICRO SCALE OPTICAL CODES ON JEWELRY AND GEMSTONES AND SCANNING MICRO SCALE OPTICAL CODES THEREOF FOR DIGITAL PERSONALIZATION

(71) Applicants: Indian Institute of Technology Bombay, Maharashtra (IN); T-Rish Gems, Mumbai (IN)

(72) Inventors: Mittal Rinku Kumar, Mumbai (IN); Mehta Prem, Mumbai (IN); Singh Ramesh Kumar, Mumbai (IN); Kothari Dinesh, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 19 days.

(21) Appl. No.: 16/410,432

(22) Filed: May 13, 2019

(65) Prior Publication Data

US 2020/0364427 A1   Nov. 19, 2020

(51) Int. Cl.
   *G06K 7/14* (2006.01)
   *H04N 5/225* (2006.01)
   *H04L 29/08* (2006.01)
   *G06K 19/06* (2006.01)
(52) U.S. Cl.
   CPC ..... *G06K 7/1417* (2013.01); *G06K 19/06037* (2013.01); *H04L 67/146* (2013.01); *H04N 5/2254* (2013.01)

(58) Field of Classification Search
   CPC .................................................... G06K 7/1417
   USPC ........................................................ 235/462.1
   See application file for complete search history.

(56) References Cited

U.S. PATENT DOCUMENTS

| 2008/0006615 | A1* | 1/2008 | Rosario | ................ | B23K 15/08 |
| | | | | | 219/121.68 |
| 2014/0008340 | A1* | 1/2014 | Urata | .................... | B23P 25/006 |
| | | | | | 219/121.76 |
| 2019/0366475 | A1* | 12/2019 | Scarselli | ............... | H04L 9/0643 |

* cited by examiner

*Primary Examiner* — Rafferty D Kelly
(74) *Attorney, Agent, or Firm* — Troutman Pepper Hamilton Sanders LLP

(57) ABSTRACT

According to the present disclosure, methods and systems for producing a microscale optical code on a precious object and reading the microscale optical code are disclosed. The method comprises the steps of providing an object, providing at least one marking unit, inscribing an array of micro-indents or micro-holes on the at least one surface of the object using at least one marking unit and generating a two-dimensional data matrix with the array of micro-indents or micro-holes. The two-dimensional data matrix has a plurality of rows and columns. The method further comprises generating a microscale optical code comprising the two-dimensional data matrix and additional four corners. The two-dimensional data matrix represents a binary code matrix of number 1 and 0 in the plurality of rows and columns with each micro-indent or micro-hole forming the binary number 1 and spot with no indent or hole forming binary number 0.

7 Claims, 3 Drawing Sheets

● Micro indent or hole

○ No hole (level surface)

m X n main data code m + 1 Rows and n + 1 columns for verification of the main data code ☐ Micro indent or hole for the alignment of the code $$
\begin{matrix}
1 & 0 & 1 & \ldots & 1 \\
0 & 1 & 1 & \ldots & 0 \\
1 & 1 & 0 & \ldots & 1 \\
\vdots & \vdots & \vdots & & \vdots \\
1 & 0 & 1 & \ldots & 1
\end{matrix}
$$

SYSTEM AND METHOD FOR PRODUCING MICRO SCALE OPTICAL CODES ON JEWELRY AND GEMSTONES AND SCANNING MICRO SCALE OPTICAL CODES THEREOF FOR DIGITAL PERSONALIZATION

TECHNICAL FIELD

The disclosure relates to personalization of objects and more particularly relates to systems and methods for producing microscale optical codes on objects such as jewelry, precious metals, natural or man-made diamonds and natural or man-made gemstones for personalization and scanning the microscale optical codes thereof.

BACKGROUND

Personalization of various merchandise, and more particularly personalization of jewelry and precious gemstones have been popular among young generations. The merchandise may be jewelry, precious metals, natural or man-made diamonds and natural or man-made gemstones. The jewelry may be a bracelet, wristwatch, ring etc. Personalization includes inscribing names, numbers, personal messages or any specific mark or design on the merchandise. It may be noted that this physical personalization has a limited impact. Hence, to enhance the customer experience, a digital personalization method can be developed which will comprise of an optical code, a scanning technique using a mobile camera and a mobile app which will process the scanned code and connect to a personalized webpage. This personalized web interface can access messages, images, videos linked to that specific jewelry/gem stone. Such personalization requires an inscribing process to create marks and designs. Generally, inscription of macroscale optical codes, such as bar, QR or customized data matrix codes can be performed via laser marking on most of the materials. However, microscale inscription of codes such as optical codes on a piece of jewelry and gemstone rings up many challenges. The challenges arise when inscribing the microscale optical codes with laser process on jewelry due to high reflectivity of the precious metals and gem stones due to their high transmissivity. Further, the scanning of such microscale optical codes is also very difficult as it would require a high-resolution camera.

Other than personalization, microscale inscription of optical codes on the jewelry is used for identification and authorization of the jewelry products and gemstones. In recent times, an appropriate QR or bar code along with the product number is printed on a plug-in label and this plug-in label is then attached to the jewelry. But such plug-in labels may get partially or permanently damaged, and thus may get linked to a wrong product when scanned.

There are various methods and systems developed for inscription of QR/bar codes on articles and jewelries using laser technology. In one method, alpha-numeric numbers are inscribed on diamonds by using the laser technology to certify them. In some other method, a QR code may be located on a wristband or any other wearable object for quickly obtaining medical information. Such medical information is obtained by scanning the QR code on these wearable objects. Similarly, some other methods describe inscription of barcode or QR codes on the surface of the jewelry, where the inscription is performed by making specular reflective and diffusive area on the surface of the jewelry by laser, etching or chemical technique. However, when performing inscription of micro-sized optical codes on articles and jewelry, these conventional methods and systems are not efficient as these techniques damage the surface of the precious material or jewelry.

Thus, there is a need for an improved method and system for inscribing micro-sized optical codes on the surface of the jewelry or precious gemstones with minimal damage to the surface of the precious material of the jewelry or gemstones.

SUMMARY

Embodiments provide a method and system for producing a microscale optical code on precious objects such as jewelry, precious metals, natural or man-made diamonds and natural or man-made gemstones by using a directed energy beam or a micromechanical process.

Embodiments further provide a method and system for scanning a microscale optical code created on precious objects such as jewelry, precious metals, natural or man-made diamonds and natural or man-made gemstones using a mobile device.

Embodiments further provide a method and system to present a personalized message to a user upon scanning the microscale optical code.

In an aspect of the present disclosure, a method for producing a microscale optical code on a precious object is disclosed. The precious object may be jewelry, precious metals, natural or man-made diamonds, natural or man-made gemstones or semi-precious gemstones. The method comprises providing an object having a front surface and a back surface, providing at least one marking unit selected from a directed energy device and a mechanical micromachining unit, inscribing an array of micro-indents or micro-holes on the at least one surface of the object using at least one marking unit and generating a two-dimensional data matrix with the array of micro-indents or micro-holes. The two-dimensional data matrix has a plurality of rows and columns. The method further comprises generating a microscale optical code comprising the two-dimensional data matrix and additional four corners, on the at least one surface of the object. The two-dimensional data matrix represents a binary code matrix of number "1" and "0" in the plurality of rows and columns with each micro-indent or micro-hole forming the binary number "1" and spot with no indent or hole forming binary number "0".

The micro optical code is a two-dimensional (m×n) data matrix of binary numbers "0" and "1". To produce the optical code on the jewelry/gemstone, an array of micro indents or micro-holes produced on the surface of the object. To represent binary number "1", micro-indents or micro-holes are created, and to represent binary number "0", the location is not machined and or left as a level surface without an indent or hole. It means presence of hole or indent represents binary number "1" and absence represents binary number "0". Further, additional one or more rows and columns with the array of micro-indents or micro-holes at certain locations are created for the verification of the micro optical code. The whole micro optical code looks like a matrix of micro-indents or micro-holes created at specific locations. Three corners of the additional four corners comprise micro-indents or micro-holes inscribed for aligning the micro scale optical code.

In another aspect of the present disclosure, a method for reading a microscale optical code produced on the object using a mobile device is disclosed. The mobile device 130 comprises a camera module 131, a user interface, an on-screen interface and one or more processors. The method comprises the steps of scanning the microscale optical code comprising the two-dimensional data matrix and additional four corners, by a camera module of the mobile device, capturing at least one image of the microscale optical code by the camera module of the mobile device, receiving the captured image of the microscale optical code at an application installed in the mobile device, processing the image of the microscale optical code to extract at least one URL address of a web page, by the application using one or more processors of the mobile device, forwarding the URL address automatically by application to a web browser of the mobile device and redirecting to the web page associated with the URL address automatically on the web browser of the mobile device. The camera module may be connected to an external zooming clip-on lens. The method further comprises rendering the web page with a pre-stored user data on an on-screen interface of the mobile device and relaying the at least one personalized message to a user wherein the pre-stored user data comprises at least one personalized message stored in a cloud database of a remote server.

In yet another aspect of the present disclosure, a system for creating a microscale optical code over a surface of an object and reading the microscale optical code is disclosed. The system comprises an object having a front surface and a back surface, at least one marking unit selected from a directed energy device and a mechanical micromachining unit, a mobile device comprising a camera module, a user interface, an on-screen interface and one or more processors and a remote server comprising a cloud database. The marking unit generates a microscale optical code on the at least one surface of the object with a two-dimensional data matrix having a plurality of rows and columns and additional four corners, by inscribing an array of micro-indents or micro-holes, the two-dimensional data matrix represents a binary code matrix of number "1" and "0" in the plurality of rows and columns with each micro-indent or micro-hole forming the binary number 1 and each spot with no indent or hole forming binary number "0", and the mobile device reads the microscale optical code produced on the at least one surface of the object.

BRIEF DESCRIPTION OF THE DRAWINGS

The detailed description is described with reference to the accompanying figures.

DETAILED DESCRIPTION OF EXEMPLARY EMBODIMENTS

A method and system for producing a microscale optical code on an object are disclosed. The present disclosure uses an inscribing process to generate such microscale optical codes on objects. Such inscribing process provides personalized precious objects such as jewelry, precious metals, natural or man-made diamonds, natural or man-made gemstones, or semi-precious gemstones.

A directed energy beam (ultrashort pulsed laser and focused ion beam) and/or micromechanical process like micro-milling and micro-drilling are used for inscribing micro scale optical codes on such precious objects. The present disclosure further describes a method and system for reading the microscale optical code produced on precious objects. A mobile device may be used for reading the microscale optical code created on the jewelry and gemstones. A zooming lens may be connected with the mobile device for capturing high quality images of the optical codes. The microscale optical code provides a personalized message to a user when scanned by the mobile device.

Figure 1:
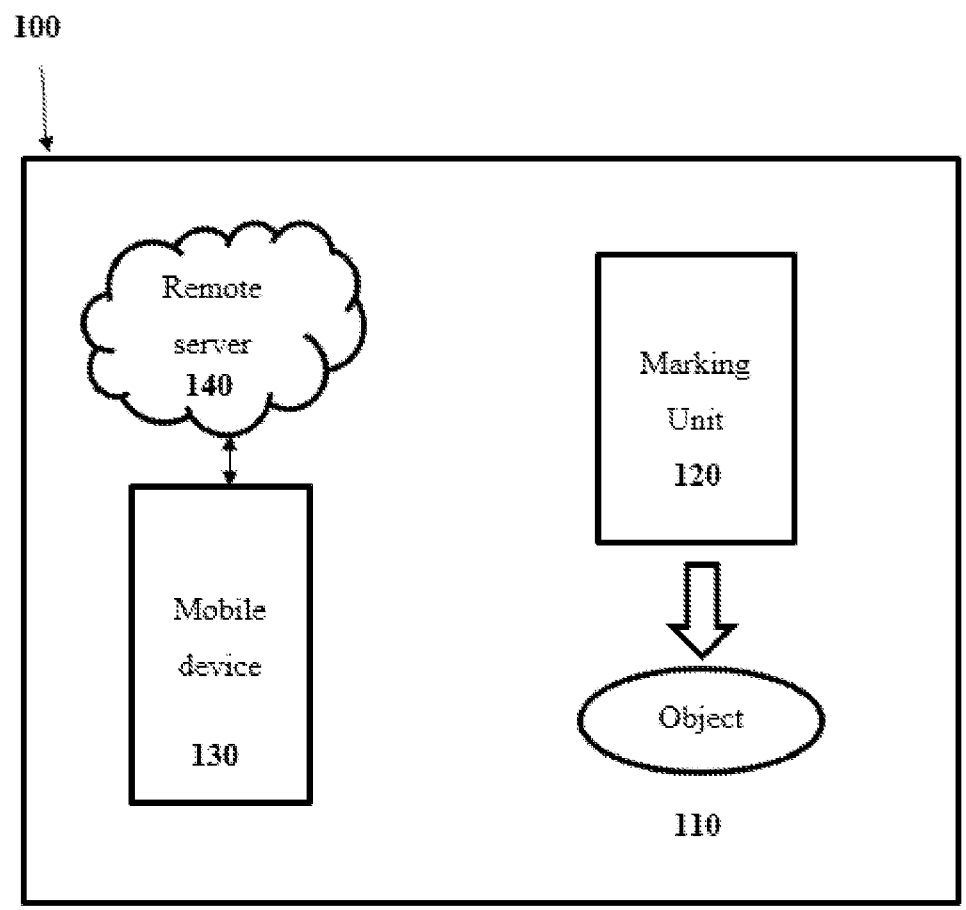
FIG. 1 illustrates a schematic diagram of a system for producing a microscale optical code over a surface of an object and reading the microscale optical code in accordance with an exemplary embodiment of the present disclosure.

Referring to FIG. 1, illustrated is a schematic diagram of a system 100 for producing a microscale optical code over a surface of an object and reading the microscale optical code in accordance with an exemplary embodiment of the present disclosure. The system 100 comprises an object 110, at least one marking unit 120, a mobile device 130 and a remote server 140. The marking unit 120 inscribes a microscale optical code on the surface of the object 110. The object 110 is a micro article having a front surface and a back surface. The object is a precious object not only limited to jewelry or a piece of jewelry, a precious metal, a natural diamond, a man-made diamond or a synthetic diamond, a natural or man-made gemstone, a semi-precious gemstone or the combinations thereof.

The marking unit 120 is selected from a directed energy device and a mechanical micromachining unit. The mechanical micromachining unit may be a micro-milling tool or a micro-drilling tool. The directed energy device may comprise an ultra-shot pulsed laser or a focused ion beam source. The mobile device 130 comprises a camera module 131 (shown in FIG. 4), a user interface, an on-screen interface and one or more processors. The camera module may comprise a zooming lens for capturing the microscale optical code. In one embodiment, the camera module may be connected to an external zooming clip-on lens for capturing the microscale optical code. The marking unit 120 generates the microscale optical code comprising an array of micro-indents or micro-holes at certain locations corresponding to binary code of number "1" and spots without an indent or hole corresponding to number "0", over the surface of the object 110, and the mobile device 130 scans the microscale optical code created over the surface of the object 110 using the camera module 131. The micro optical code may be generated on any side of the object, preferably on the front side of the object.

The microscale optical code is a customized optical code comprising two-dimensional data matrix and four corners at the peripheral corners of the two-dimensional data matrix. These additional four corners may be used for aligning the microscale optical code. The indents or holes are in the size of microns. The micro-indents or micro-holes are inscribed in circular shapes. The two-dimensional data matrix is a matrix of any size (m×n) with a plurality of rows (m) and columns (n) as per the required resolution of the code. The two-dimensional data matrix comprises a binary code matrix with numbers either a binary number "1" or a binary number "0" in the rows and columns.

An array of micro-indents or micro-holes is inscribed on a surface of the object using the marking unit 120, preferably on the front surface of the object. The two-dimensional data matrix is then generated with the array of micro-indents or micro-holes. The microscale optical code with two-dimensional data matrix and four corners is formed on the surface of the object 110. Each micro-indent or micro-hole forms the binary number "1" and each spot with no indent or hole forms number "0" of the binary code matrix.

Figures 2, 3:
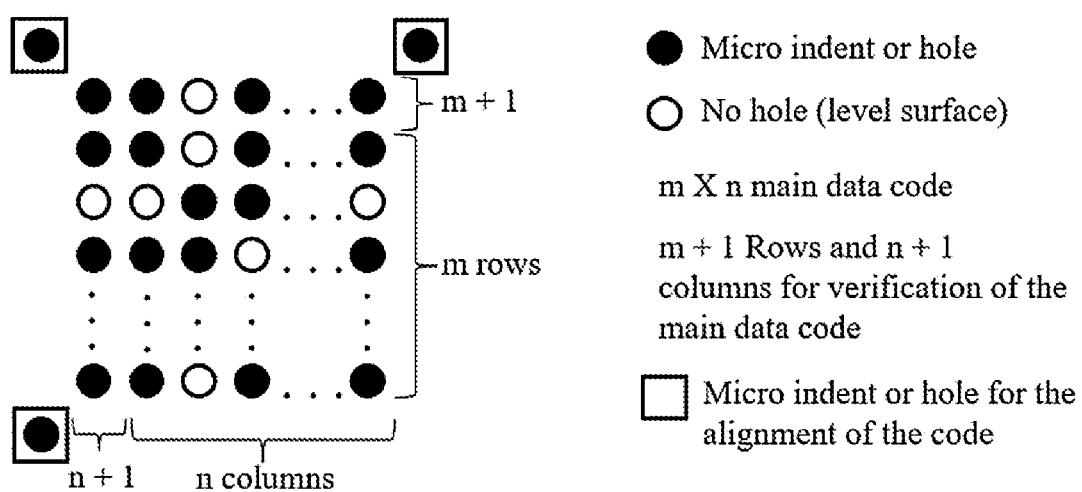
FIG. 2 illustrates a two-dimensional data matrix in a binary format in accordance with the present disclosure.
FIG. 3 illustrates the created microscale optical code on the object with the two-dimensional data matrix in accordance with the present disclosure.

FIG. 2 illustrates a two-dimensional data matrix in a binary format in accordance with the present disclosure. The micro-indents or micro-holes represent binary number "1" and the absence of hole or indent represents binary number "0". In other words, the binary code of number "0" denotes a planar region in the surface of the object. Three of the additional four corners are intentionally inscribed with micro-indents or micro-holes for aligning the microscale optical code. Thus, the three corners of microscale optical code comprise the binary code of number "1" for aligning the microscale optical code. Further, the data matrix may comprise additional one or more rows (m+1) and columns (n+1) for the verification of the microscale optical code. FIG. 3 illustrates such microscale optical code created on the object with the two-dimensional data matrix in accordance with the present disclosure.

Figure 4:
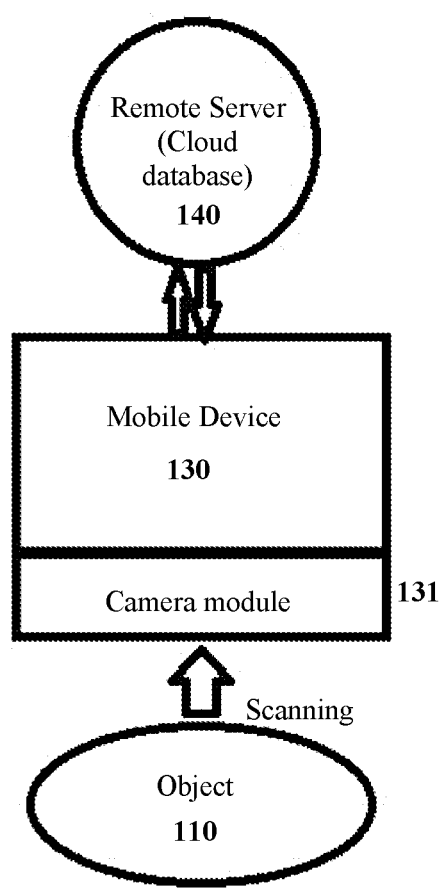
FIG. 4 illustrates a schematic of the method and system for reading a microscale optical code created over a surface of the object in accordance with the present disclosure.

In another embodiment of the present disclosure, a method for reading a microscale optical code produced on the object 110 is disclosed. FIG. 4 illustrates a schematic of the system for reading a microscale optical code created over a surface of the object. The mobile device 130 is used for reading a microscale optical code produced over a surface of the object 110. The mobile device 130 comprises a camera module 131, a user interface, an on-screen interface and one or more processors. The microscale optical code comprises the two-dimensional data matrix and additional four corners as said in the previous embodiments. The customized microscale optical code on the precious object is scanned by a camera module of the mobile device. The mobile device can capture a high-resolution image or video of the microscale optical code created on the surface of the object. In one implementation of the disclosure, the camera module 131 is connected to an external zooming clip-on lens for capturing a high-resolution image or video of the microscale optical code. The camera module 131 captures one or more images of the microscale optical code. In some embodiments, a separate scanning device may be used for capturing high-resolution images of the microscale optical code.

A software application is installed in the mobile device for an image processing of the captured images or videos of the microscale optical code. The software application receives the captured images of the microscale optical code. The captured images of the microscale optical code further may be processed at the software application using one or more processors of the mobile device 130. The software application decodes the microscale optical code in the captured image and extracts at least one URL address corresponding to a web page. The extracted URL address is automatically forwarded by the software application to a web browser of the mobile device 130. The web browser runs on the on-screen interface. The web browser automatically loads the web page of the extracted URL address, the web page associated with the URL address is redirected automatically on the web browser of the mobile device 130. The web page may retrieve a pre-stored user data from a remote server.

The remote server 140 may comprise a cloud database; the pre-stored user data is stored in the cloud database of a remote server 140. The cloud database can store a plurality of pre-stored user data. Each pre-stored user data is assigned with a unique address. The URL address of the web page provides the unique address to access the pre-stored user data stored at the cloud database. When a web page associated with the URL address is loaded on the web browser, the pre-stored user data corresponding to the unique address of the URL address, is rendered on an on-screen interface of the mobile device 110. In an example, the on-screen interface is a touch screen interface of the mobile device.

The pre-stored user data comprises at least one personalized message. The personalized message is relayed to a user through the on-screen interface of the mobile device. The personalized message may comprise a content in any of the format such as audio, video, GIF, text or any other format based on the personalization method. For example, the personalized message may comprise a greeting message, wishes, or a reminder, or an information about the merchandise. The mobile device is a portable device not only limited to a smartphone, PDA, tablet, laptop or any other handheld device. The mobile device either displays or plays the personalized message on the on-screen interface of the mobile device.

Further, the user can change the personalized message by logging into the web page using the software application. The present disclosure provides a best commercial use of the personalized merchandise that can be gifted with some personal message and the receiver (user) can see the message on the mobile device whenever he/she scans the code. Thus, the present disclosure is much useful in personalization of jewelry and precious gemstone industries.

Although the present disclosure has been described in the context of certain aspects and embodiments, it will be understood by those skilled in the art that the present disclosure extends beyond the specific embodiments to alternative embodiments and/or uses of the disclosure and obvious implementations and equivalents thereof. Thus, it is intended that the scope of the present disclosure described herein should not be limited by the disclosed aspects and embodiments above.

We claim:

1. A method of producing a microscale optical code on an object, the method comprising:
   providing the object having a front surface and a back surface, wherein the object is selected from a group comprising a jewelry, precious metals, gemstones, and combinations thereof;
   providing a marking unit comprising both a directed energy device and a mechanical micromachining unit, wherein the directed energy device comprises an ultra-shot pulsed laser and a focused ion beam source and the mechanical micromachining unit comprises one of a micro-milling tool and a micro-drilling tool;
   inscribing an array of micro-indents or micro-holes on at least one surface of the object by both the directed energy device and the mechanical micromachining unit;
   generating a main code having a two-dimensional data matrix code with the array of micro-indents or micro-holes, wherein the two-dimensional data matrix has a plurality of predetermined number of rows and columns (m×n); and
   generating a whole microscale optical code comprising main code, at least one additional row (m+1) and column (n+1), and additional four corners, on the at least one surface of the object;
   wherein the main code represents a binary code matrix of number 1 and 0 in the plurality of predetermined number of rows and columns with each micro-indent or micro-hole forming the binary number 1 and each spot with no indent or hole forming binary number 0, and the at least one additional row (m+1) and column (n+1) are inscribed to verify the main code and the additional four corners are inscribed outside the main code and the at least one additional row (m+1) and column (n+1) and only at peripheral corners without the row and column of micro-indent or micro-hole, wherein three of the additional four corners comprise micro-indents or micro-holes inscribed for aligning the microscale optical code.

2. The method as claimed in claim 1, wherein the array of micro-indents or micro-holes is inscribed in circular shapes.

3. A method for reading a microscale optical code produced on an object by a smartphone, the smartphone comprising a camera module, a user interface, an on-screen interface and one or more processors, the method comprising the steps of:
   scanning by the camera module of the smartphone, a whole microscale optical code comprising the two-dimensional data matrix code with the array of micro-indents or micro-holes produced in a plurality of predetermined number of rows and columns (m×n), at least one additional row (m+1) and column (n+1) and additional four corners, wherein the object is selected from a group comprising a jewelry, precious metals, gemstones, and combinations thereof), wherein the object is selected from a group comprising a jewelry, precious metals, and combinations thereof;
   capturing at least one image of the microscale optical code by the camera module of the smartphone;
   receiving the captured image of the microscale optical code at an application installed in the smartphone;
   processing the image of the microscale optical code to extract at least one URL address of a web page, by the application using one or more processors of the smartphone;
   forwarding the URL address automatically by the application to a web browser of the smartphone;
   redirecting to the web page associated with the URL address automatically on the web browser of the smartphone;
   rendering the web page with a pre-stored user data on the on-screen interface of the mobile device, wherein the pre-stored user data comprises at least one personalized message, stored in a cloud database of a remote server; and
   relaying the at least one personalized message to a user on the on-screen interface;
   wherein the main code represents a binary code matrix of number '1' and '0' in the plurality of predetermined number of rows and columns (m×n) with each micro-indent or micro-hole forming the binary number 1 and each spot with no indent or hole forming binary number 0, and the at least one additional row (m+1) and column (n+1) are inscribed to verify the main code, and the additional four corners are inscribed outside the main code and additional row (m+1) and column (n+1) and only at peripheral corners of the two-dimensional data matrix and three of the additional four corners comprise micro-indents or micro-holes inscribed for aligning the microscale optical code, wherein the microscale optical code is produced on the object by both the directed energy device and the mechanical micromachining unit, and the directed energy device comprises an ultra-shot pulsed laser and a focused ion beam source.

4. The method as claimed in claim 3, wherein processing the image of the microscale optical code comprises decoding the microscale optical code in the captured image.

5. A system for producing a microscale optical code on an object and reading the microscale optical code, comprising:
   the object having a front surface and a back surface, wherein the object is selected from a group comprising a jewelry, precious metals, gemstones, and combinations thereof;
   a marking unit comprising both a directed energy device and a mechanical micromachining unit, wherein the directed energy device comprises an ultra-shot pulsed laser and a focused ion beam source and the mechanical micromachining unit comprises one of a micro-milling tool and a micro-drilling tool;
   a smartphone comprising a camera module, a user interface, an on-screen interface and one or more processors; and
   a remote server comprising a cloud database;
   wherein both the directed energy device and the mechanical micromachining unit generates a microscale optical code on the at least one surface of the object with a main code having a two-dimensional data matrix code having a plurality of predetermined number rows and columns (m×n), at least one additional row (m+1) and column (n+1), and additional four corners, by inscribing an array of micro-indents or micro-holes, the two dimensional data matrix main code represents a binary code matrix of number '1' and '0' in the plurality of predetermined number of rows and columns (m×n) with each micro-indent or micro-hole forming the binary number 1 and each spot with no indent or hole forming binary number 0, the at least one additional row (m+1) and column (n+1) are inscribed to verify the main code and the smartphone mobile device reads the whole microscale optical code produced on the at least one surface of the object, the additional four corners are inscribed outside the main code and additional row (m+1) and column (n+1) and only formed at the peripheral corners of the two dimensional data matrix without the row and column of micro-indent or micro-hole, wherein the three of the additional four corners comprise micro-indents or micro-holes inscribed for aligning the microscale optical code.

6. The system as claimed in claim 5, wherein the array of micro-indents or micro-holes are inscribed in circular shapes.

7. The system as claimed in claim 5, wherein the camera module is connected to an external zooming clip-on lens.

* * * * *